United States Patent [19]
Kishi et al.

[11] Patent Number: 5,833,780
[45] Date of Patent: Nov. 10, 1998

[54] PNEUMATIC RADIAL TIRE FOR HEAVY LOADS

[75] Inventors: Atao Kishi; Hirokatsu Maruyama, both of Hiratsuka, Japan

[73] Assignee: The Yokohama Rubber Co., Ltd., Tokyo, Japan

[21] Appl. No.: 659,525

[22] Filed: Jun. 6, 1996

[30] Foreign Application Priority Data

Jun. 21, 1995 [JP] Japan .................................. 7-154968
Jun. 28, 1995 [JP] Japan .................................. 7-162254
Jan. 29, 1996 [JP] Japan .................................. 8-013302

[51] Int. Cl.⁶ .................. B60C 11/13; B60C 101/00; B60C 105/00
[52] U.S. Cl. ...................................................... 152/209 R
[58] Field of Search .................... 152/209 R, 209 D, 152/454

[56] References Cited

U.S. PATENT DOCUMENTS

| | | | |
|---|---|---|---|
| 3,763,911 | 10/1973 | Montagne | 152/209 R |
| 4,360,049 | 11/1982 | Imai | 152/454 |
| 5,323,825 | 6/1994 | Yamagishi et al. | 152/209 R |
| 5,345,988 | 9/1994 | Kabe et al. | 152/209 R |
| 5,445,201 | 8/1995 | Kukimoto et al. | 152/209 R |

FOREIGN PATENT DOCUMENTS

| | | | |
|---|---|---|---|
| 169305 | 6/1990 | Japan . | |
| 179508 | 7/1990 | Japan | 152/209 R |
| 136906 | 6/1991 | Japan | 152/209 R |
| 246213 | 9/1993 | Japan | 152/209 R |
| 319028 | 12/1993 | Japan | 152/209 R |
| 319029 | 12/1993 | Japan | 152/209 R |
| 239109 | 8/1994 | Japan | 152/209 R |
| 1549347 | 8/1979 | United Kingdom | 152/209 R |

OTHER PUBLICATIONS

Japan 5–246213 translation.

*Primary Examiner*—Steven D. Maki
*Attorney, Agent, or Firm*—Nikaido, Marmelstein, Murray & Oram LLP

[57] ABSTRACT

A pneumatic radial tire for heavy loads, formed by providing the shoulder side edge portions of at least the second inner ribs or block rows counted from the outermost parts of a tread portion with narrow ribs of a height equal to that of the ribs or block rows via narrow grooves, and chambering the edge portions of these narrow ribs or inclining the depthwise axes of these narrow grooves from a tread surface toward a tread center.

1 Claim, 10 Drawing Sheets

PNEUMATIC RADIAL TIRE FOR HEAVY LOADS

BACKGROUND OF THE INVENTION

This invention relates to a pneumatic radial tire used for heavy load vehicles, such as trucks and buses, and more particularly to a pneumatic radial tire for heavy loads which is adapted to prevent the partial abrasion of the second outermost rows of ribs or blocks on a tread surface.

Among the tread patterns for a pneumatic radial tire for heavy loads, a rib-based pattern having a high abrasion resistance is used in many cases. However, in this rib-based pattern, frictional energy is concentrated on the edges of, especially, the second outermost ribs due to the lateral force occurring when a vehicle turns. Since the abrasion of these edge portions progresses more speedily than that of the other portions, partial abrasion including punching of ribs and railway abrasion is liable to occur.

The inventors of the present invention previously proposed (Japanese Patent Laid-Open No. 246213/1993) the techniques for providing narrow ribs, which extend in the circumferential direction of a tire, along side edge portions of the shoulders of the second outermost ribs via narrow grooves as countermeasures for minimizing the occurrence of partial abrasion of the second outermost ribs on such a pneumatic radial tire for heavy loads, so as to concentrate the frictional energy, which occurs when a vehicle turns, on these narrow ribs and so as to spread the abrasion to the other ribs.

However, the partial abrasion preventing effect of these techniques is obtained only when the end portions of the narrow ribs are deformed easily and slip smoothly with respect to a road surface when the same end portions receive a lateral force. Accordingly, the partial abrasion preventing effect is large when the lateral force occurring during the turning of a vehicle is large, for example, when the vehicle speed is high or when the vehicle is at full load. However, when the vehicle speed is low or when the loadage is low, a satisfactory partial abrasion preventing effect cannot be obtained.

Since a rib pattern has a high abrasion resistance as compared with a block pattern, it is applied to a pneumatic tire for heavy loads in many cases. However, a rib pattern-carrying pneumatic tire for heavy loads has a problem that the outer diameter of an arcuate tread surface of the tire decreases toward the tread shoulders. Therefore, a peripheral speed difference based on a radius difference occurs between a tread center portion and tread shoulder portions, so that the shoulder ribs and intermediate ribs, the peripheral speeds of which are low, are dragged by a road surface to cause the side end portions of the tread shoulders to be worn greatly, i.e., partial abrasion, such as rib punches it liable to occur.

The reducing of the rigidity of the shoulder edges by providing narrow grooves, which extend continuously in the circumferential direction of the tire, in the portions of a tire which are on the somewhat inner side of the shoulder edges, or by providing a plurality of kerfs with a predetermined pitch along the shoulder edges products a good effect in preventing the partial abrasion of the shoulder ribs.

In order to prevent the partial abrasion of the shoulder-side end portions of the intermediate ribs, forming narrow ribs by providing narrow grooves, which extend in the circumferential direction of the tire, in the shoulder-side end portions of the intermediate ribs as mentioned above (Japanese Patent Laid-Open No. 246213/1993), and reducing the tread height of these narrow ribs so as to form stepped narrow ribs and have an abrasive force concentrated on these stepped narrow ribs (Japanese Patent Laid-Open Nos. 169305/1990 and 319029/1993) were proposed.

However, the latter measures in which stepped narrow ribs are formed cause the effective ground contacting area of a tire to decrease, so that the abrasion resisting life of the tire as a whole decreases. The former measures cause abrasion to occur on the narrow ribs alone in spite of the fact that the tread height of these narrow ribs is equal to that of a rib body in an initial abrasion period, so that the effective ground contacting area of the tire decreases finally during the use of the tire with the abrasion resisting life of the tire as a whole also decreasing.

The inventors of the present invention have thoroughly discussed the cause of the partial abrasion occurring on the ribs, to ascertain that not only the dragging of the tread due to the difference in the peripheral speed in the circumferential direction of the tire of different parts of the tread but also a comparatively large dragging of the tread in the axial direction of the tire causes the partial abrasion to increase.

When a radial tire having a conventional rib pattern contacts the ground with a load received, a ground contacting shape (footprint) of a tread surface bent arcuately in a cross-section taken in the direction of the meridian of the tire becomes as shown in FIG. 17(A), in which the shapes of ribs 52 not yet in contact with the ground and shown by broken lines change into those shown by solid lines, the tread in a cross-section taken in the direction of the meridial of the tire changing as shown in FIG. 17(B). Namely, the rubber of the shoulder-side end portions, i.e. the portions of the tire which have smaller outer diameters moves toward the center as shown by arrows, and this movement causes the rubber of these portions to be dragged on the road surface and the abrasion thereof to increase.

SUMMARY OF THE INVENTION

A first object of the present invention is to provide a pneumatic radial tire for heavy loads capable of obtaining an excellent partial abrasion restraining effect even when a vehicle travels at a low speed or with a light load.

A second object of the present invention is to provide a pneumatic radial tire for heavy loads capable of restraining the partial abrasion thereof by reducing a dragging force occurring in the axial direction of the tire on a ground contacting portion of a tread thereof without causing a decrease in the effective ground contacting area of the tread.

The present invention which achieves the first object provides a pneumatic radial tire for heavy loads, wherein a belt layer comprising a plurality of plies is arranged in the part of a tread portion which is on the outer circumference of a carcass layer, a plurality of main grooves extending in the circumferential direction of the tire being provided in an outer surface of the tread portion so as to form a plurality of ribs or block rows separated by these main grooves, characterized in that the shoulder side edge portions of at least the second inner ribs or block rows counted from the outermost parts of the tread portion are provided via narrow grooves with narrow ribs which have a height equal to that of the ribs or block rows, which extend in the circumferential direction of the tire, the edge portions of these narrow ribs being chamfered, an imaginary width $W_2$ of each of the narrow ribs not chambered yet with respect to a width $W_1$ of each of the ribs or block rows adjacent to the narrow ribs being set to:

$$W_2 = (0.1 - 0.5)W_1$$

The shoulder-side edge portions of at least the second outermost ribs or block rows are provided therein with narrow ribs, the height of which is equal to that of these rows, via narrow grooves. This enables the frictional energy to be concentrated in these narrow ribs, the transmission of the frictional energy to other ribs or block rows to be refrained, and the partial abrasion of the ribs or block rows to be prevented. Moreover, the rigidity of the free end portions of the narrow ribs is reduced by chamfering the edge portions thereof. Therefore, even when a lateral force occurring during the turning of a vehicle is comparatively small, the free end portions of the narrow ribs are deformed easily and slide smoothly on a road surface, so that the frictional energy is concentrated easily on the narrow ribs. Accordingly, an excellent partial abrasion refraining effect can be displayed even when a lateral force is small, i.e., even when a vehicle travels at a low speed or with a light load.

The present invention which achieves the second object provides a pneumatic radial tire for heavy loads, wherein a belt layer comprising a plurality of plies is arranged in the part of a tread portion which is on the outer circumference of a carcass layer, a plurality of main grooves extending in the circumferential direction of the tire being provided in an outer surface of the tread portion so as to form a plurality of ribs or block rows separated by these main grooves, characterized in that the shoulder side edge portions of at least the second inner ribs or block rows counted from the outermost parts of the tread portion are provided with narrow grooves extending in the circumferential direction of the tire and having depthwise axes inclining from the tread surface toward a tread center, so as to divide the ribs or block rows into narrow ribs of an unchanged height and ribs or block rows adjacent to the tread center side portions of the narrow ribs, a ratio $W_2/W_1$ of a width $W_2$ of each of the narrow ribs to that $W_1$ of each of the ribs or block rows adjacent to the tread center side portions of the narrow ribs being set in the range:

$$0.1 \leq W_2/W_1 \leq 0.5,$$

an angle of inclination $\alpha$ of a depthwise axis of each of the narrow grooves with respect to the normal of the tread surface, and an angle of inclination $\beta$ of each of tread center side groove walls of the ribs or block rows adjacent to the tread center side portions with respect to the normal of the treat surface being set so that they have the relation of $0<\alpha<\beta$, and the relation between these angles $\alpha$, $\beta$ and an angle of inclination $\theta$ of a tread-aligning surface of each of the ribs or block rows adjacent to the tread center side portions of the narrow ribs with respect to the axis of the tire of:

$$3.4\theta \leq (\alpha+\beta)/2 \leq 6.4\theta.$$

Although the ribs or block rows are divided in this manner by narrow grooves, the height of the resultant narrow ribs and that of the ribs or block rows adjacent to the tread center side narrow ribs are set equal. Therefore, the effective ground contacting area of the tread does not substantially decrease.

Since the depthwise axes of the narrow grooves are inclined from the tread surface toward the tread center, the cross-sectional shape along a meridian of each of the tread center side-separated ribs or block rows becomes substantially rhomboidal and inclined toward a relative shoulder. Accordingly, when the separated ribs or block rows contact the ground surface, the bend thereof toward the shoulders becomes liable to occur. The bending actions toward the shoulders and the frictional force from the road surface toward the center of the tire shown in FIG. 17 mentioned above are offset each other.

As shown in FIG. 16(B), on the tread surfaces of the ribs 32, the bending actions of a larger-width rib 32a (rib or block row adjacent to the tread center side portion of a narrow rib) and the frictional force exerted from the road surface toward the tread center are offset each other. Consequently, only the movement of the rubber in the circumferential direction of the tire substantially remains as shown in FIG. 16(A), and excessive slide of the tire is restrained, so that the partial abrasion of the tire decreases.

Since the narrow ribs separated on the side of the tread shoulders by the narrow grooves of the above-described construction have a trapezoidal cross-sectional shape with respect to the direction of a meridian of the tire, they support the bend of the larger-width ribs when a vehicle turns a corner or travels with a high load, so that excessive bend of the rib which causes the buckling thereof does not occur.

Figure 1:
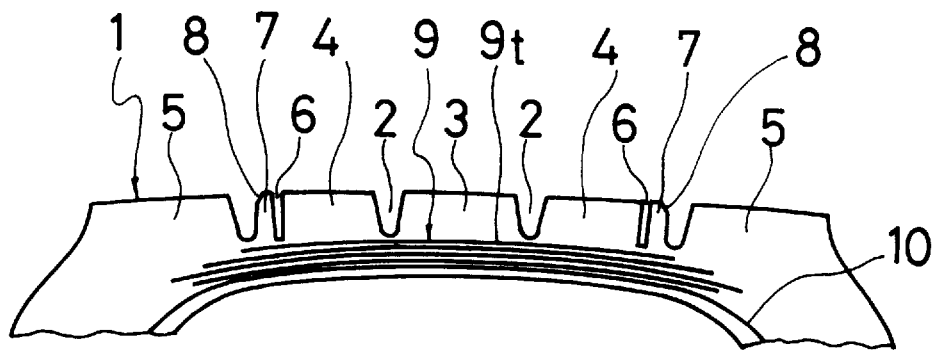
FIG. 1 is a sectional view of a tread portion of an example of the pneumatic radial tire for heavy loads according to the present invention taken along a meridian of the tire.
Figure 2:
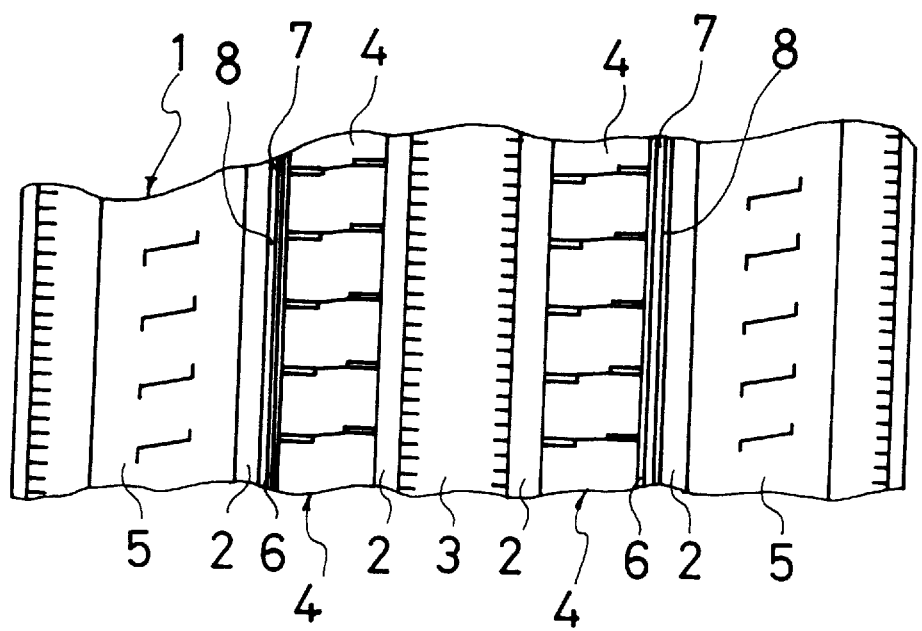
FIG. 2 is a development view of a part of a tread surface of the same tire.

DESCRIPTION OF THE PREFERRED EMBODIMENTS (1) Referring to FIGS. 1 and 2, a tread portion 1 is provided in its outer surface with four main grooves 2 extending in the circumferential direction of a tire, by which main grooves 2 a center rib 3, middle ribs 4, 4 on the left and right sides of the center rib, and outermost shoulder ribs 5, 5 are separated from one another. The main grooves 2 are formed so that each thereof has a width of 10–20 mm, and the number of these grooves may be even or odd, i.e., it is not specially limited.

The tire in this embodiment is provided on the inner side thereof with one carcass layer 10, both end portions of which extend to bend portions (not shown) via side wall portions (not shown). Not less than two carcass layers 10 may be provided as necessary. On the outer circumference of the carcass layer 10, a belt layer comprising a plurality of plies and using steel cords as reinforcing cords is provided, and the reinforcing cords in different ply cross each other.

Each of the middle ribs 4 positioned secondly inside counted from the outermost shoulder ribs 5 on the tread portion is provided with a narrow rib 7 at a shoulder-side edge portion thereof via a narrow groove 6. Below this narrow rib 7, the outermost layer member 9t of the belt layer extends so as to overlap the narrow rib 7.

Figure 3:
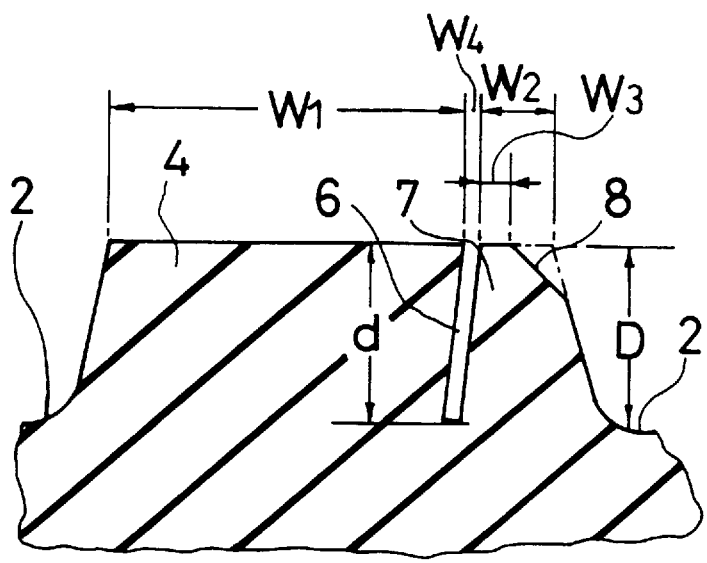
FIG. 3 is an enlarged sectional view of a principal part of the tread portion shown in FIG. 1 which is in the vicinity of a narrow rib.

As shown in an enlarged drawing of FIG. 3, the narrow rib 7 is chamfered 8 at a shoulder side (outer side portion of the tire) edge portion thereof so that this end portion has a smaller width and a reduced rigidity. On the other hand, a root portion of the narrow rib 7 is formed so that the rigidity thereof further increases owing to the outermost layer member 9t of the belt layer 9 extending below the narrow rib 7 as mentioned above.

Figure 4:
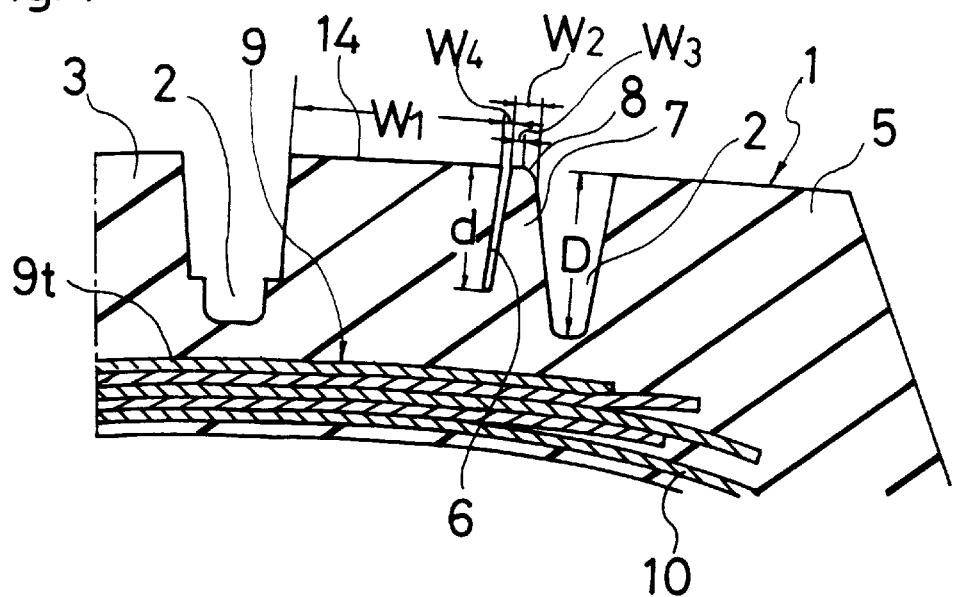
FIG. 4 is a sectional view of a principal part of a tread portion of another example of the pneumatic radial tire for heavy loads which is taken along a meridian of the tire.
Figure 5:
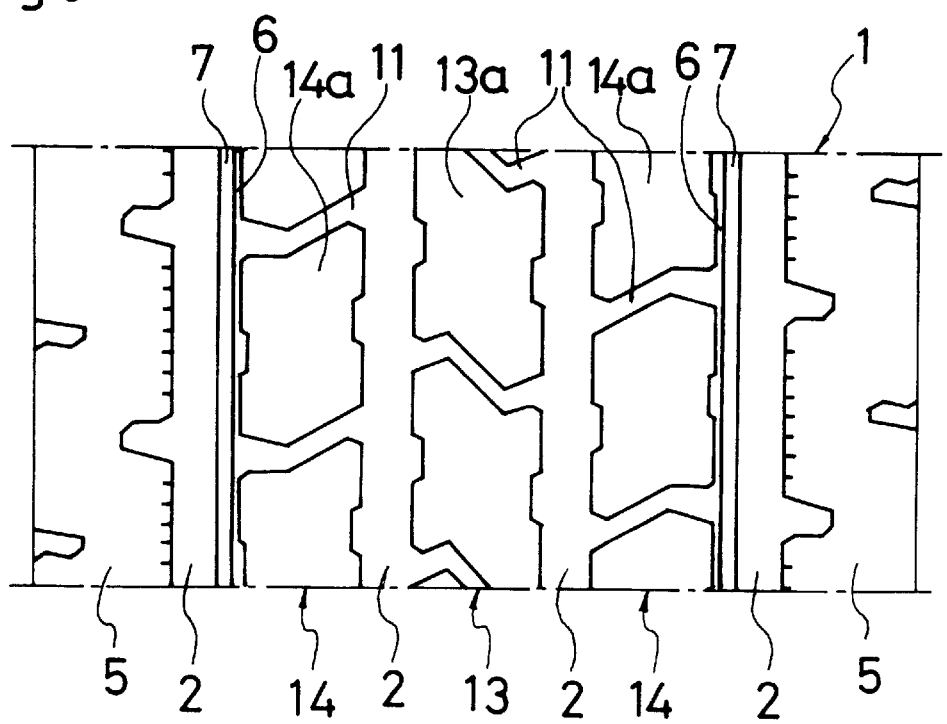
FIG. 5 is a development view of a part of the tread surface of the tire of FIG. 4.

FIGS. 4 and 5 show a tread portion of a pneumatic radial tire for heavy loads showing another mode of embodiment of the present invention.

This mode of embodiment is different from that of embodiment of FIGS. 1 and 2 in that the center rib 3 and middle ribs 4 in the latter are separated into a plurality of blocks 13a, 14a by a plurality of lateral grooves 11 provided with a predetermined pitch in the circumferential direction of the tire, whereby block rows 13, 14 are formed, the construction of the remaining parts of these two embodiments being substantially identical.

Namely, narrow ribs 7 extending in the circumferential direction of the tire are formed in the block rows 14, which are positioned second from the outermost shoulder ribs 5, at the shoulder side edge portions thereof via the narrow grooves 6, and the edge portions of the narrow ribs 7 are chambered 8. Below these narrow ribs 7, the outermost layer member 9t of the belt layer 9 extend so as to overlap the narrow ribs 7.

Figure 6:
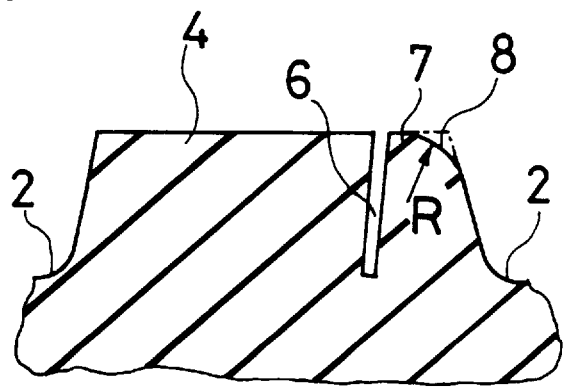
FIG. 6 is an enlarged sectional view of a principal part of the tread portion in another mode of embodiment which is in vicinity of a narrow rib.

According to the present invention, the chambered portion 8 of each narrow rib 7 may have a diagonally linear cross-sectional shape as shown in FIG. 3, and also an arcuate cross-sectional shape having a radius R as shown in FIG. 6. The arcuate chamfering of 8 the narrow rib 7 may be done so that an upper end part of the chamfered portion 8 is joined to an upper surface of the narrow rib 7 tangentially without forming an edge as shown in FIG. 6, or crosswise so as to form an edge.

Figure 7:
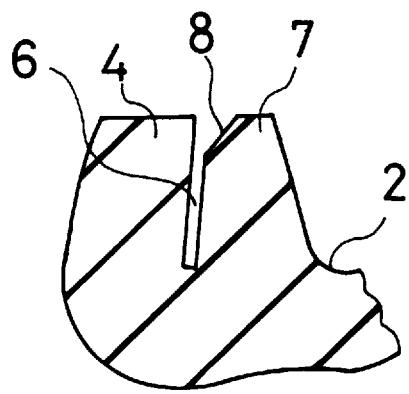
FIG. 7 is an enlarged sectional view of a principal part of the portion in still another mode of embodiment which is in the vicinity of a narrow rib.
Figure 8:
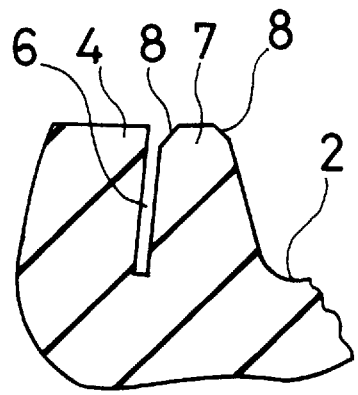
FIG. 8 is an enlarged sectional view of a principal part of the tread portion in a further mode of embodiment which is in the vicinity of a narrow rib.
Figure 9:
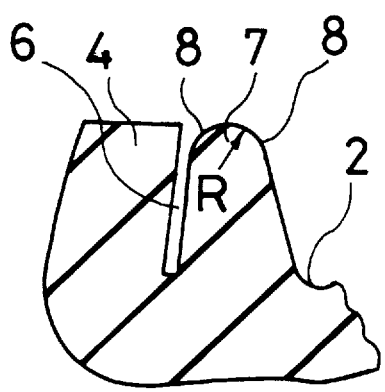
FIG. 9 is an enlarged sectional view of a principal part of the tread portion in another mode of embodiment which is in the vicinity of a narrow rib.

Although the chamfering 8 is preferably done at the shoulder side edge portion of a narrow rib 7, it may also be done without trouble at the edge portion of a middle rib 4 or a block row 14 which is on the opposite side of the shoulder side edge portion of the rib 7 as shown in FIG. 7. The chamfering may also be done at the edge portion on both sides of the narrow rib 7 as shown in FIGS. 8 and 9.

In the tire according to the present invention described above, narrow ribs 7 the height of which is equal to that of the ribs 4 or block rows 14 are provided at the edge portions of the second ribs 4 or block rows 14 counted from the outermost ribs via narrow grooves 6, and the edge portions of the narrow ribs 7 are chamfered 8. The narrow ribs slip on a road surface with their free end portions deformed by a lateral force when the vehicle turns, to have the frictional energy to be concentrated on the narrow ribs 7. Therefore, the frictional energy spread over the ribs 4 or block rows 14 adjacent to the narrow ribs 7 is reduced, whereby the partial abrasion of these second ribs 4 or block rows 14 is restrained.

Moreover, since the rigidity of the free end portions of the narrow ribs 7 is set low by chamfering 8 the same, the narrow ribs are deformed easily and slip even when the lateral force is small during the turning of the vehicle, and the concentration of the frictional energy on the narrow ribs 7 is effected reliably. Accordingly, even when the vehicle travels at a low speed or with light load, an excellent partial abrasion restraining effect is displayed.

According to the present invention, it is necessary that a width (imaginary width) $W_2$ of an upper surface of the narrow rib 7 not yet chamfered 8 be 0.1–0.5 times (i.e., $W_2=(0.1-0.5)W_1$) as large as that $W_1$ of the middle rib 4 or block row 14 adjacent to the narrow rib 7. When the imaginary width $W_2$ of the narrow rib 7 is smaller than $0.1W_1$, the rigidity of the narrow rib 7 is too low, a sacrificing effect of the narrow rib for abrasion cannot be obtained. Conversely, when this width is larger than $0.5W_1$, the rigidity of the narrow rib 7 becomes too high, and it becomes difficult that the narrow rib be deformed. Therefore, it becomes difficult to concentrate the frictional energy on the narrow rib 7.

The frictional energy exerted on the narrow rib 7 is expressed by a physical quantity proportional to the product of a ground contacting pressure and slippage. Therefore, in order to further improve the partial abrasion prevention effect obtained by the abrasion sacrifice of the narrow rib 7 in the present invention, an idea for increasing the frictional energy to as great an extent as possible may be elaborated.

When the outermost layer member 9t of the belt layer 9 is extended under the narrow rib 7 as mentioned above from this point of view, the rigidity of the root portion of the narrow rib 7 increases, whereby the ground contacting pressure of the narrow rib 7 can be advantageously increased. It is also advantageous that a width $W_3$ of the upper surface of the narrow rib 7 which has been subjected to the chamfering 8 be set 0–⅓ times as large as the imaginary width $W_2$ of the upper surface of the narrow rib 7 which has not yet been subjected to the chamfering 8 (i.e., $W_3=(0-⅓)W_2$).

The reasons reside in that, when the width $W_3$ of the upper surface is set not more than ⅓ of the imaginary width $W_2$, the flexural rigidity of the upper end portion of the narrow rib 7 decreases to cause the slippage with respect to a road surface to increase. When the flexural rigidity of the upper end portion of the narrow rib 7 decreases, the narrow rib 7 is deformed easily to have a slip to occur even when the lateral force occurring when the vehicle turns is small. This enables the partial abrasion of the tire to be restrained even when the vehicle travels at a low speed or with a light load.

The depth d of the narrow grooves 6 also causes the rigidity of the narrow rib 7 to vary, and has influence upon the magnitude of the ground contacting pressure. Therefore, it is preferable that the depth d of the narrow groove 6 be set ½–1 times as large as that D of the main groove 2 adjacent to the narrow groove 6 (i.e., d=(½–1)D). The depth d may be set more preferably to d=(½–0.8)D. When the depth d is set larger than that D of the main groove, a decrease in the rigidity of the narrow rib 7 increases. This not only prevents the improvement of the ground contacting pressure but also causes the durability of the narrow rib to decrease. Conversely, when the depth d of the narrow groove is smaller than D/3, the rigidity of the narrow rib 7 becomes too high, and a slip becomes difficult to occur. Consequently, the effect in concentrating the frictional energy on the narrow rib decreases.

In the tire according to the present invention, it is preferable that a width $W_4$ of the narrow groove 6 be set 0.5–1 times as large as the imaginary width $W_2$ of the narrow rib 7 which has not yet been chamfered (i.e., $W_4=(0.5-1-)W_2$). When the width $W_4$ of the groove is smaller than $0.5W_2$, cracks are liable to occur in the bottom of the narrow 6, and, when the width $W_4$ is larger than the imaginary width $W_2$ of the narrow rib 7, the durability of the narrow rib decreases. More precisely, the width $W_4$ of the narrow groove 6 may be set in the range of 0.5–4 mm.

Example 1

Tires 1–3 according to the present invention and comparative tires 1 and 2 all of which had a size of 11R22.5 14PR, a tread pattern shown in FIG. 2, a height of narrow ribs equal to that of the other ribs, arcuate chamfered portions (radius R=2 mm), which were shown in FIG. 6, at the shoulder-side end regions, a ratio $W_3/W_2$ of the width $W_3$ of the upper surface of the chamfered narrow ribs to the imaginary width $W_2$ thereof not yet chamfered of 0, a ratio $W_4/W_2$ of the width $W_4$ of the narrow grooves to the imaginary width $W_2$ of the narrow ribs of 0.7, a ratio of d/D of the depth d of the narrow grooves to that D of the main grooves of 1.0, and the outermost layer member of the belt layer not extended to positions under the narrow ribs with a ratio $W_2/W_1$ of the imaginary width $W_2$ of the narrow ribs to that $W_1$ of the middle ribs set variously as shown in Table 1 were manufactured.

As a reference tire for the comparative evaluation of the test tires, a conventional tire 1 having the same size and tread pattern with the narrow ribs not subjected to chamfering was manufactured.

These six kinds of tires were subjected to the measurement of partial abrasion resistance of the treads by using the following test method, and the results shown in Table 1 were obtained.

(Partial abrasion resistance)

The test tires were set on the rims on two front axles of a vehicle (2—2·D) of a dead weight tonnage of 10, and the vehicle was made run with a load 50% (1350 kg/piece) of a standard load of JATMA (Japan Tire Standards) so that the vehicle travelled on a general paved road by not less than 90%. The partial abrasion of the middle ribs was measured after the vehicle ran about 50000 km without changing the positions of the tires.

The partial abrasion was evaluated as follows. The railway abrasion and rib punches were graded in three classes according to the scale and size respectively, i.e., "large", "medical" and "small" by visually examining the tread surfaces, and the evaluation was made on the basis of the rate of generation thereof. The results of evaluation are expressed by indexes based on 100 which represents the partial abrasion resistance of the conventional tire. The larger indexes indicated higher partial abrasion resistance.

TABLE 1

| Tire | $W_2/W_1$ | Partial abrasion resistance |
| --- | --- | --- |
| Conventional Example 1 | (0.3) | 100 |
| Comparative Example 1 | 0.05 | 100 |
| Present Invention 1 | 0.1 | 110 |
| Present Invention 2 | 0.3 | 120 |
| Present Invention 3 | 0.5 | 110 |
| Comparative Example 2 | 0.6 | 100 |

Example 2

Tires 4–9 according to the present invention all of which had a size of 11R22.5 14PR, a tread pattern shown in FIG. 5, a height of narrow ribs equal to that of other block rows, tapering chamfered portions, which were shown in FIG. 4, at the shoulder side end regions, a ratio $W_2/W_1$ of the imaginary width $W_2$ of the narrow ribs to the width $W_1$ of the block rows adjacent thereto of 0.3, and a ratio $W_4/W_2$ of the width $W_4$ of the narrow grooves to the imaginary width $W_2$ of the narrow ribs of 0.7 with a ratio $W_3/W_2$ of the width $W_3$ of the upper surfaces of the narrow ribs which were already subjected to chamfering to the imaginary width $W_2$ of the narrow ribs, a ratio d/D of the depth d of the narrow grooves to that D of the main grooves, and the extending condition of the outermost layer member of the belt layer with respect to the positions under the narrow ribs set variously as shown in Table 2 were manufactured.

As a reference tire for the comparative evaluation of the test tires, a conventional tire 2 having the same size and tread pattern in which the narrow ribs were not chamfered with the outermost layer member of the belt layer not extended to the positions under the narrow ribs was manufactured.

These tires were subjected to the measurement of partial abrasion resistance of the treads by using the same test method as in Example 1, and the results shown in Table 2 were obtained.

TABLE 2

| Tire | Outermost layer member of the belt layer extended or not extended to positions under the narrow ribs | $W_3/W_2$ | d/D | Partial abrasion resistance |
| --- | --- | --- | --- | --- |
| Conventional Example 2 | No | — | 1.0 | 100 |
| Present Inventions 4 | No | 0.4 | 1.0 | 110 |
| Present Inventions 5 | Yes | 0.4 | 1.0 | 120 |
| Present Inventions 6 | No | 0.3 | 1.0 | 115 |
| Present Inventions 7 | Yes | 0.3 | 1.0 | 125 |
| Present Inventions 8 | No | 0.2 | 0.8 | 120 |
| Present | Yes | 0.2 | 0.8 | 130 |

TABLE 2-continued

| Tire | Outermost layer member of the belt layer extended or not extended to positions under the narrow ribs | $W_3/W_2$ | d/D | Partial abrasion resistance |
|---|---|---|---|---|
| Inventions 9 | | | | |

It is understood from Table 2 that the partial abrasion resistance of the tires 4–9 according to the present invention is improved as compared with that of the conventional tire. It is also understood that, out of the tires 4–9 according to the present invention, the tires with the outermost layer member of the belt layer extended to the positions under the narrow ribs have a high partial abrasion resistance as compared with those with the outermost layer member of the belt not extended to the mentioned positions, and that, when a ratio of the width $W_3$ of chamfered is not more than $W_2$ of the same ribs not yet chamfered is not more than ⅓, an excellent partial abrasion resistance improving effect is obtained.

As described above, the pneumatic radial tire for heavy loads according to the present invention enables the partial abrasion of the second outermost ribs or block rows to be restrained excellently even when a vehicle travels at a low speed or with a small loadage.

(2) According to the present invention, the shoulder side edge portions of at least the second inner ribs or block rows counted from the outermost parts of the tread portion are provided with narrow grooves extending in the circumferential direction of the tire and having depthwise axes inclining from the tread surface toward a tread center, so as to divide the ribs or block rows into narrow ribs of an unchanged height and ribs or block rows adjacent to the tread center side portions of the narrow ribs, a ratio $W_2/W_1$ of a width $W_2$ of each of the narrow ribs to that $W_1$ of each of the ribs or block rows adjacent to the tread center side portions of the narrow ribs being set in the range:

$$0.1 \leq W_1/W_1 \leq 0.5$$

an angle of inclination α of a depthwise axis of each of the narrow grooves with respect to the normal of the tread surface, and an angle of inclination β of each of tread center side groove walls of the ribs or block rows adjacent to the tread center side portions with respect to the normal of the tread surface being set so that they have the relation of 0<α<β, and the relation between these angles α, β and an angle of inclination θ of a tread-aligning surface of each of the ribs or block rows adjacent to the tread center side portions of the narrow ribs with respect to the axis of the tire of:

$$3.4\theta \leq (\alpha+\beta)/2 \leq 6.4\theta$$

According to the present invention, the ratio of the width $W_2$ of the narrow ribs to that $W_1$ of wider ribs (ribs or block rows adjacent to the tread center side portions of the narrow ribs), i.e. $W_2/W_1$ is set in the range of $0.1 \leq W_2/W_1 0.5$, and preferably in the range of $0.1 \leq W_2/W_1 0.25$. When the width $W_2$ of the narrow ribs is smaller than $W_1$ of 0.1 of the wider ribs, it becomes difficult to make a buckling prevention action with respect to the excessive bend of the wider ribs. When the width $W_2$ is so large as to exceed the width $W_1$ of 0.5 of the wider ribs, it becomes difficult to make full use of the above-mentioned bending action of the wider ribs.

When the tire is set on a proper rim and inflated to a standard air pressure, the angle of inclination α of the side wall surfaces of the wider ribs and that β of the tread center side wall surfaces thereof are set substantially equal but it is necessary that these angles have the relation of α<β. Owing to the relation of α<β, it becomes possible to prevent the wider ribs from being bent extremely greatly toward the shoulders, and maintain the rigidity thereof at a suitable level.

The angles of inclination α, β of the wider ribs are set so that, when the tire is set on a proper rim and inflated to a standard air pressure, a value of ½ of the sum of these angles, i.e. $(\alpha+\beta)/2$ becomes not less than 3.4θ and not more than 6.4θ with respect to an angle of inclination Θ of the tread-aligning surfaces of the wider ribs. When the value of $(\alpha+\beta)/2$ becomes smaller than 3.4θ, satisfactory bending actions of the wider ribs toward the shoulders cannot be obtained when the ribs contact the ground surface. When this value becomes larger than 6.4θ, excessive bending actions of the wider ribs toward the shoulders occur to cause the portions of the narrow groove bottoms which are on the side of the wider ribs to crack.

According to the present invention, narrow grooves by which the wider ribs and narrow ribs prescribed in the present invention are separated from each other may be provided at least in the intermediate ribs, and some other known partial abrasion prevention means may be used for the shoulder ribs. Such counter-measures are not required in principle for the center rib since partial abrasion does not substantially occur thereon.

The main grooves and ribs provided so as to extend in the circumferential direction of a tire may be linear or bent zigzag. The narrow grooves by which the ribs are divided into wider ribs and narrow ribs may also be linear or bent zigzag.

The depth and width of the main grooves may be in the range of levels used generally for a pneumatic radial tire for heavy loads. For example, the depth of the main grooves is preferably in the range of 13–16 mm, and the width thereof in the range of 10–15 mm. The widths of the center rib, intermediate ribs and shoulder ribs are not specially limited, and they may be set in the ranges used for a general pneumatic radial tire. The widths of these ribs may be preferably set in the range of 20–35 mm.

The width of the narrow ribs by which ribs are divided into wider ribs and narrow ribs may be set in the range of ¼–⅒ of that of the main grooves, and preferably in the range of 1.5–3.0 mm. The depth of the narrow grooves may be set in the range of 80–100% of that of the main grooves. The angle of inclination α of the narrow grooves may be set in the range of 1'–14', and the angle of inclination β of the tread center side wall surfaces of the wider ribs in the range of 10'–15'.

Figure 10:
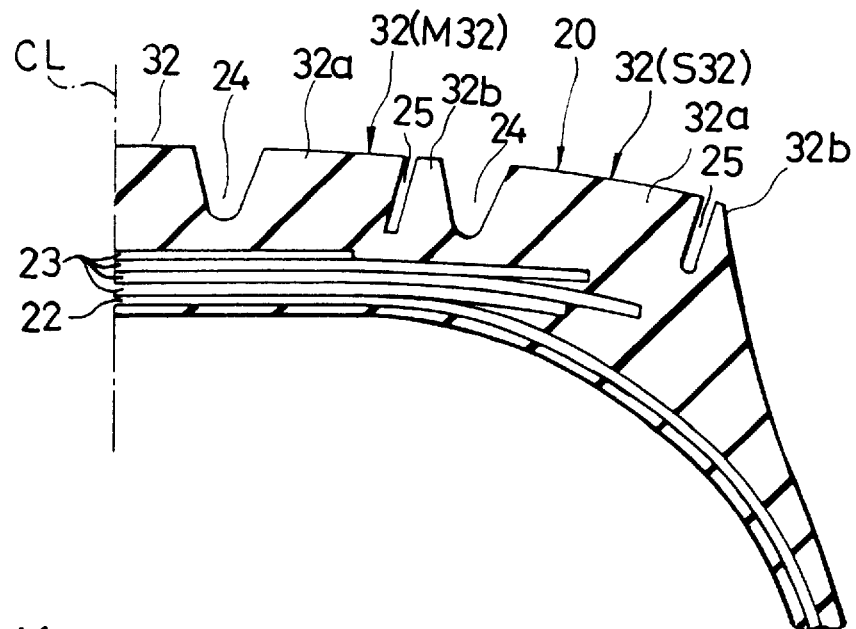
FIG. 10 is a sectional view of a half of still another example of pneumatic radial tire for heavy loads according to the present invention taken along a meridian of the tire.
Figure 11:
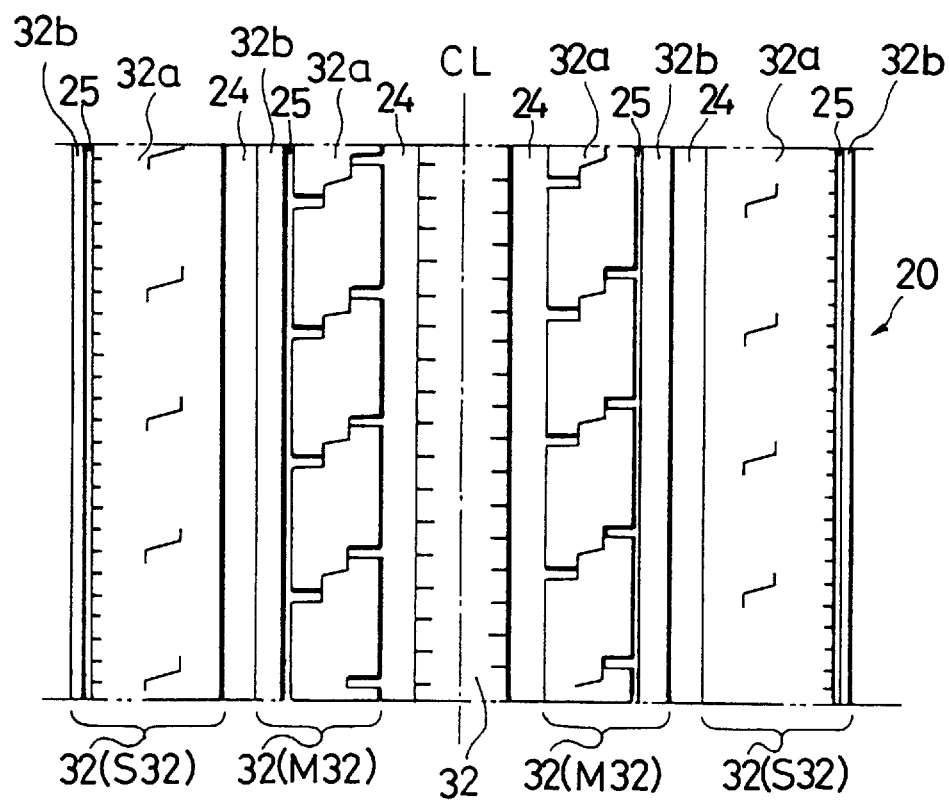
FIG. 11 is a plan view of a principal portion of the tread surface of the tire of FIG. 10.

FIG. 10 is a sectional view of a half of the pneumatic radial tire for heavy loads according to the present invention taken along the meridian of the tire, and FIG. 11 illustrates the tread surface of the same tire. A reference numeral 20 denotes a tread, 22 a carcass layer, and 23 belt layers.

The tread 20 is provided in its outer circumferential surface (tread surface) with a plurality (four in the illustrated embodiment) of main grooves 24 extending continuously in the circumferential direction of the tire, and these main grooves form a rib pattern having a plurality (five in the illustrated embodiment) of ribs 32 separated thereby. Out of these ribs 32, an intermediate rib M32 (corresponding to the middle rib 4 positioned second from the outer end of the tread in FIGS. 1 and 2) and a shoulder rib S32 are provided with narrow grooves 25, which extend continuously in the circumferential direction of the tire, in the portions thereof which are offset to the relative shoulder in such a manner that wider ribs 32a and narrow ribs 32b are formed on the side of the tread center and on the side of the shoulder respectively. Referring to the drawings, reference letters CL denote the center line of the tread 20 (which agrees with the equator of the tire).

The narrow grooves 25 are provided so that the depthwise axes thereof incline from the tread surface toward the tread center, and, due to these inclined narrow grooves 25, the cross-sectional shape taken along a meridian of the tire of the wider ribs 32a is substantially similar to a rhomboidal shape inclined toward the relative shoulder. The narrow grooves 25 are provided in the portions of the intermediate rib M32 and shoulder rib S32 which are offset to the relative shoulder, and the width $W_2$ of the narrow ribs 32B has relation with respect to that $W_1$ of the wider ribs 32a of $0.1 \leq W_2/W_1 \leq 0.5$, and preferably $0.1 < W_2/W_1 \leq 0.25$ (refer to FIG. 12).

Figure 12:
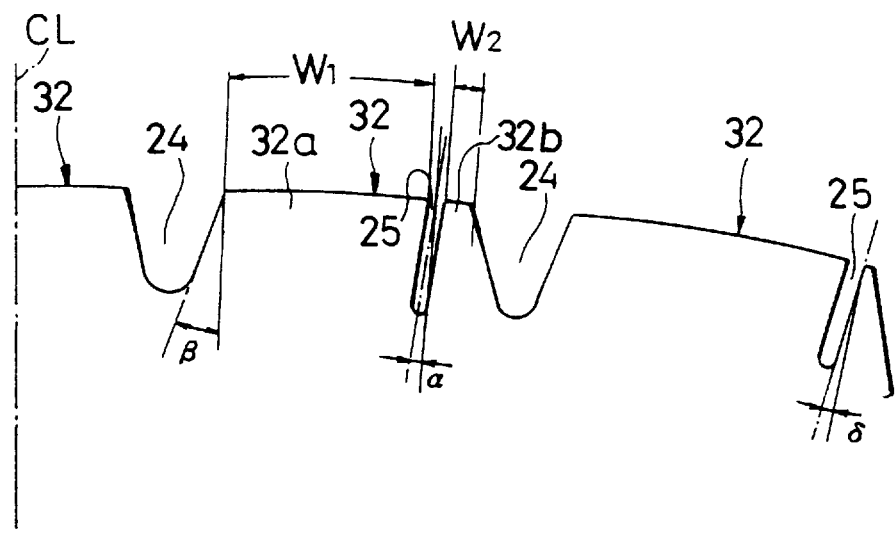
FIG. 12 is a longitudinal section of a principal part of the tread portion of the tire of FIG. 10.

Although the angle of inclination $\alpha$ of the narrow grooves 25, i.e. the angle a of inclination of the depthwise axes of the narrow grooves 25 with respect to the normal of the tread surface is substantially close to that $\beta$ of the tread center side groove walls of the wider ribs 32a with respect to the normal of the tread surface, they have relation of $0 < \alpha < \beta$ (refer to FIG. 12). These angles of inclination $\alpha$, $\beta$ have relation with the angle of inclination $\theta$ of the tread surface-aligning surface of the wider rib 32a with respect to the axial direction of the tire of $3.4\theta \leq (\alpha+\beta)/2 \leq 6.4\theta$.

Figure 13:
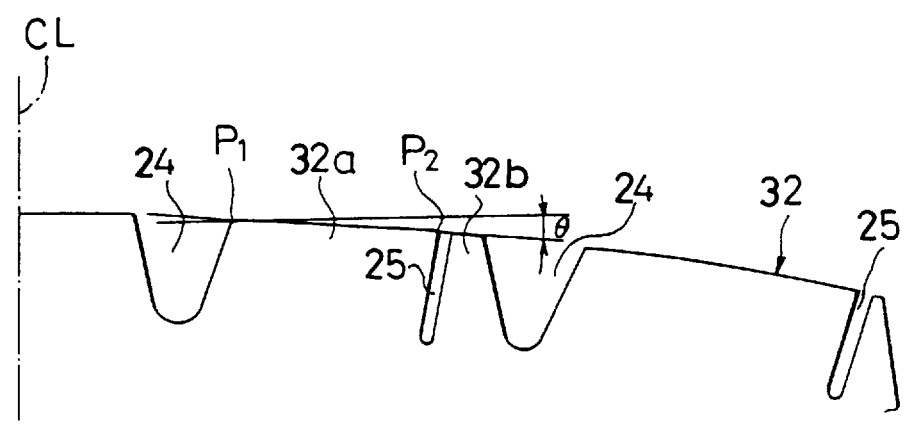
FIG. 13 is a longitudinal section of a principal part of the tread portion of the tire of FIG. 10 in an inflated state.

The direction of the tread surface-aligning surface of the wider rib 32a referred to above is defined as a straight line connecting together a tread center side end portion $P_1$ in a cross section, which is taken along a meridian of the tire, of the wider rib 32a and a shoulder side end portion $P_2$ in the same cross section of the tire set on a proper rim and inflated with air to a standard air pressure (refer to FIG. 13).

In the embodiment shown in FIGS. 10 and 11, the narrow ribs 25 defined above are provided in both the intermediate rib M32 and shoulder rib S32. This narrow rib 25 may be provided at least in the intermediate rib positioned between the center rib and shoulder rib. In order to obtain a shoulder rib of a rigidity-reduced partial abrasion prevention structure, some other known structure may be employed.

Figure 14:
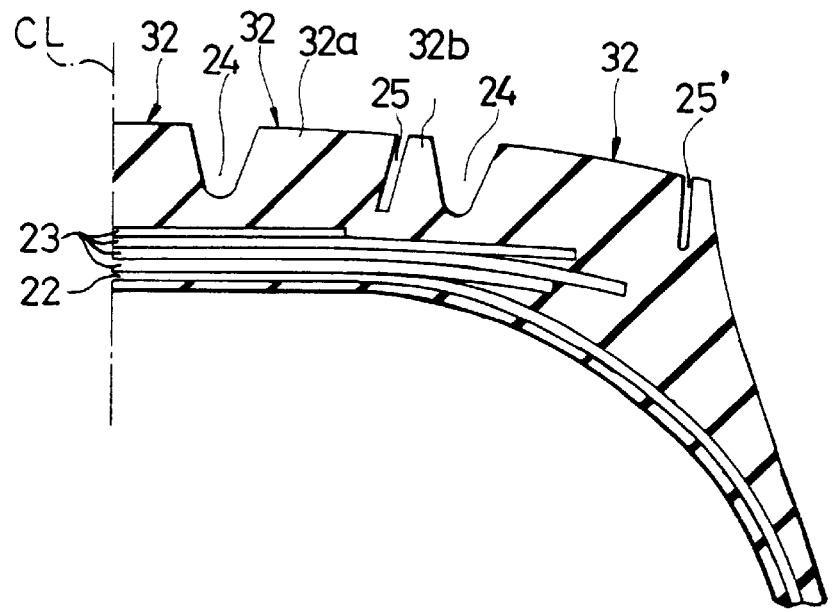
FIG. 14 is a sectional view of a half of another example of pneumatic radial tire for heavy loads according to the present invention taken along a meridian of the tire.

FIG. 14 shows a mode of embodiment in which a shoulder rib S32 is formed to some other structure. In this embodiment, a narrow groove 25 of the above-prescribed structure is provided in an intermediate rib M32, while a narrow groove 25' of a structure different from that prescribed above is provided in a shoulder rib S32.

Since the depthwise axis of the narrow grooves 25α provided in this shoulder rib S22 is not inclined from the tread surface toward the tread center, the cross-sectional shape in the direction of a meridian of the tire of a wider rib 32a is not rhomboidal but trapezoidal.

This mode of embodiment also enables the same partial abrasion restraining effect as in the embodiment of FIGS. 10 and 11 to be obtained.

Figure 15:
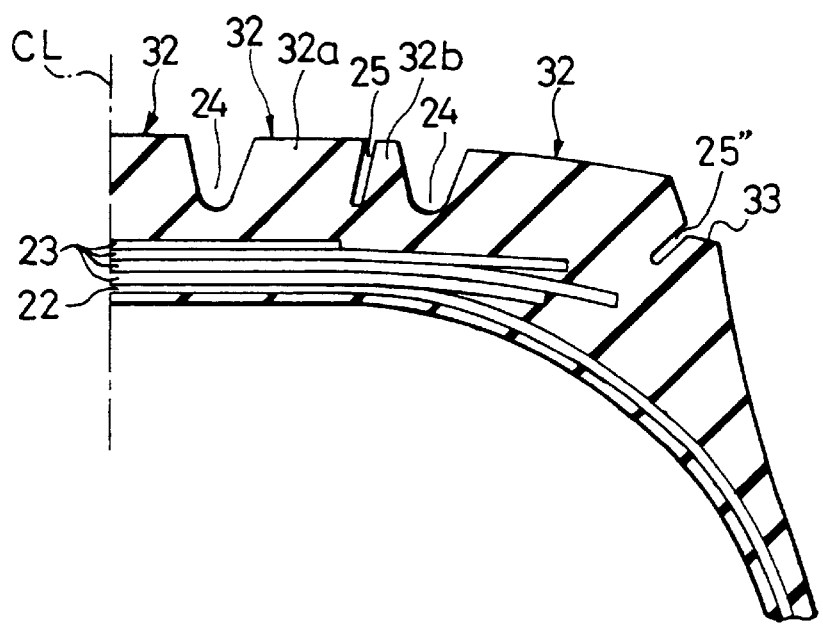
FIG. 15 is a sectional view of a half of still another example of pneumatic radial tire for heavy loads according to the present invention taken along a meridian of the tire.
Figure 16A:
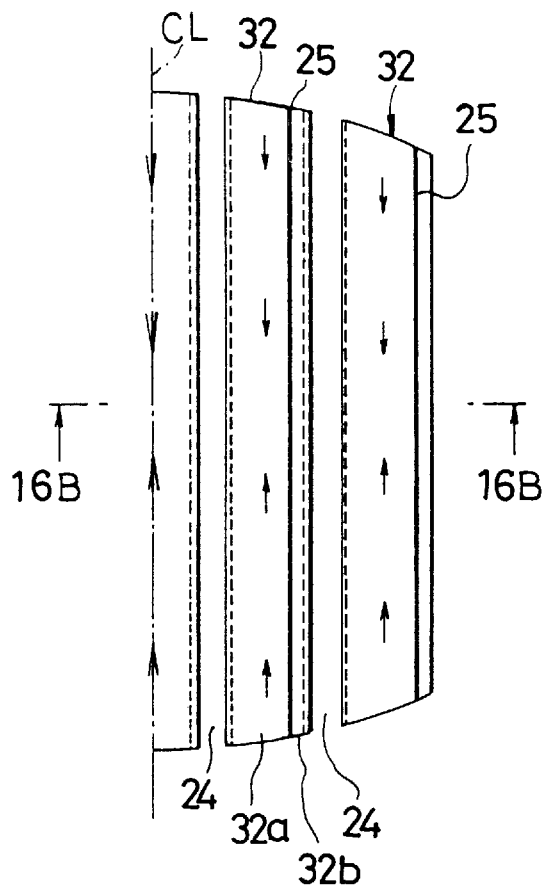
FIG. 16 shows a ground contacting portion of the tread of the tire according to the present invention, wherein (A) is a plan view showing a pattern of the same portion, and (B) a sectional view taken along the arrowed line 16B—16B in (A)
Figure 16B:
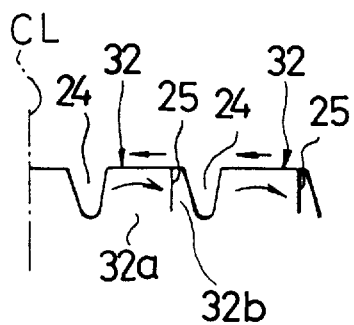
Figure 17A:
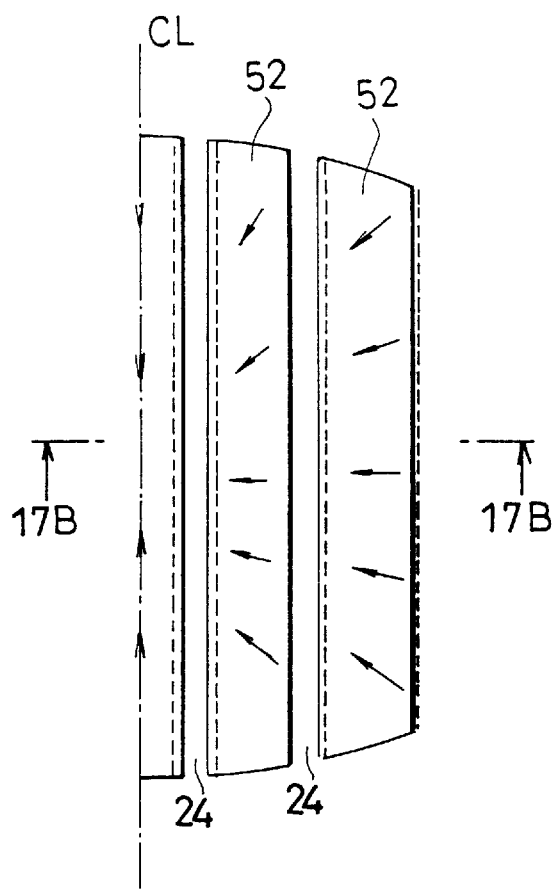
FIG. 17 shows a ground contacting portion of the tread of a conventional pneumatic radial tire for heavy loads, wherein (A) is a plan view showing a pattern of the same portion, and (B) a sectional view taken along the arrowed line 17B—17B in (A).
Figure 17B:
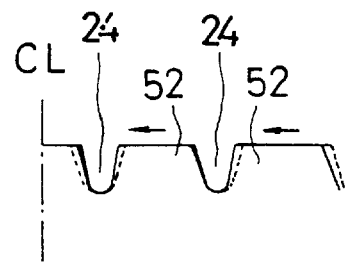

FIG. 15 shows another mode of embodiment in which a shoulder rib S32 is formed to another structure.

In this mode of embodiment, a narrow groove 25 prescribed above is provided in the same manner in an intermediate rib M32, and a diagonally extending narrow groove 25" in the portion of the wall surface of a shoulder rib S32 which is on the outer side of a shoulder end so that the narrow groove 25" extends in the circumferential direction of the tire, a non-ground-contacting rib 33 being provided on the outer side of the narrow groove 25".

This mode of embodiment also enables the same partial abrasion restraining effect as in the embodiment of FIGS. 10 and 11 to be obtained.

The narrow rib 32b may be chamfered at its edge portion as shown in FIGS. 3, 6, 7 and 8.

Example 3

Tires 10–15 according to the present invention and comparative tires 3–7 all of which had a size of 11R22.5 14PR, a tread pattern shown in FIG. 11, narrow grooves in the intermediate and shoulder ribs, and the width and angle of inclination $\delta$ of the narrow groove in the shoulder rib of 2 mm and 5° respectively with a width ratio $W_2/W_1$ of the wider rib to narrow rib in the intermediate rib, an angle of inclination $\alpha$ of the narrow groove, and a value of $(\alpha+\beta)/2$ (wherein the angle of inclination $\beta$ was set constantly to 15°) of the angle of inclination a of the narrow groove and that $\beta$ of the tread center side wall surface of the wider rib set variously as shown in Table 3 were manufactured (refer to FIGS. 12 and 13).

For the comparative evaluation of the test tires, a conventional tire of the same size in which narrow ribs were not provided in any of the ribs was manufactured.

These twelve kinds of pneumatic radial tires for heavy loads were set on a rim on a front axle of a 10-ton truck (2–2D vehicle), and the resultant truck was made to rum 40000 km. The condition of occurrence of partial abrasion on the tread surface of each of the resultant tire was examined visually, and the results shown in Table 3 were obtained.

TABLE 3

| Tire | $W_2/W_1$ | $\alpha$ | $(\alpha + \beta)/2$ | Partial abrasion |
|---|---|---|---|---|
| Conventional Example 3 | — | — | — | Rib punching occurred |
| Comparative Example 3 | 0.05 | 5° | 10.0 (4.3θ) | Cut and tear occurred in the narrow ribs |
| Comparative Example 4 | 0.1 | 0° | 7.5 (3.3θ) | Punching occurred in the wider ribs |
| Present Invention 10 | 0.1 | 1° | 8.0 (3.5θ) | None |
| Present Invention 11 | 0.1 | 5° | 10.0 (4.3θ) | None |
| Present Invention 12 | 0.1 | 14° | 14.5 (6.3θ) | None |
| Comparative Example 5 | 0.1 | 15° | 15.0 (6.5θ) | Cracks occurred in the narrow grooves |
| Present Invention 13 | 0.2 | 5° | 10.0 (4.3θ) | None |
| Comparative Example 6 | 0.25 | 0° | 7.5 (3.3θ) | Feather edge abrasion occurred on the wider ribs |
| Present Invention 14 | 0.25 | 5° | 10.0 (4.3θ) | None |
| Present Invention 15 | 0.25 | 14° | 14.5 (6.3θ) | None |
| Comparative Example 7 | 0.3 | 5° | 10.0 (4.3θ) | Punching occurred in the narrow ribs |

(Note: The angle of inclination $\beta$ was set to 15° in all the test tires.)

It is understood from the results in Table 3 that partial abrasion did not substantially occur on all of the Tires 10–15 according to the present invention which satisfy the conditions for the present invention.

Example 4

The tire 11 according to the present invention in Example 3 and a tire (Comparative Example 8) obtained by forming stepped portions on the narrow ribs of the tire 11 according to the present invention were set on the rims on the front axles of a 10-ton truck (2–2•D vehicle) in the same manner as in Example 3, and the resultant truck was made to run 40000 km. The abrasion of these tires was compared, and the results shown in Table 4 were obtained.

TABLE 4

| Axle on which the tires were set | Tire | Abrasion (mm) | Condition of partial abrasion |
|---|---|---|---|
| Front axle on the front side | Present Invention 11 | 2.6 | None |
| | Comparative Example 8 | 3.1 | None |
| Rear axle on the front side | Present Invention 11 | 4.8 | None |
| | Comparative Example 8 | 5.6 | None |

(Note) The tires set on the left and right portions of the same axle were then set on the right and left portions thereof after the vehicle travelled 10000 km, and such reversion of the positions of the tires was repeated every time the vehicle travelled 10000 km.

It is understood from the results shown in Table 4 that the abrasion life of the tire (Comparative Example 8) having stepped narrow ribs is inferior to that of the Tire 11 according to the present invention.

Example 5

The same tire 11 according to the present invention as in Example 3 and a tire (Present Invention 16) obtained by providing narrow grooves of the mode of FIGS. 10 and 11 in the shoulder ribs on a tire identical with the tire 11 in Example 3 were set on the rims on the front axle of a 10-ton truck (2–2•D vehicle) in the same manner as in Example 3, and the resultant truck was made to run 40000 km, and the condition of occurrence of partial abrasion of the tread surfaces was examined visually. The results shown in Table 5 were obtained.

TABLE 5

| Axle on which the tires were set | Tire | Condition of partial abrasion |
|---|---|---|
| Front axle on the front side | Present Invention 11 | None |
| | Present Invention 16 | None |
| Rear axle on the front side | Present Invention 11 | None |
| | Present Invention 16 | None |

(Note) The tires set on the left and right portions of the same axle were then set on the right and left portions thereof after the vehicle travelled 10000 km, and such reversion of the positions of the tires was repeated every time the vehicle travelled 10000 km.

It is understood from the results shown in Table 5 that partial abrasion did not substantially occur on any of the two kinds of test tires (Present Inventions 11 and 16).

In the pneumatic radial tire for heavy loads according to the present invention, narrow grooves are provided at least in the shoulder-side edge portions of the second ribs or block rows counted from the outermost parts of the tread portion so as to form wider ribs and narrow ribs as mentioned above, and the height of the narrow ribs is set equal to that of the wider ribs. Therefore, the effective ground contacting area of the tread does not decrease, and, moreover, the rubber of the ground contacting surface of the tread is restrained so that the rubber does not substantially move in the axial direction of the tire, whereby the dragging of the tire in the axial direction thereof is reduced. Accordingly the partial abrasion restraining effect can be improved.

What is claimed is:

1. A pneumatic radial tire for heavy loads, wherein a belt layer comprising a plurality of plies is arranged in a part of a tread portion which is on an outer circumference of a carcass layer, a plurality of main grooves extending in the circumferential direction of said tire being provided in an outer surface of said tread portion so as to form a plurality of tread elements separated by said main grooves, the tread elements including axially outermost tread elements and second inner tread elements, shoulder side edge portions of at least the second inner tread elements counted from the axially outermost tread elements of said tread portion being provided with narrow grooves extending in the circumferential direction of said tire and having depthwise axes inclining from said tread surface toward a tread center, so as to divide said second inner tread elements into narrow ribs of an unchanged height and tread elements adjacent to said narrow ribs, a ratio $W_2/W_1$ of a width $W_2$ of each of said narrow ribs to a width $W_1$ of each of said tread elements adjacent to said narrow ribs being set in the range:

$$0.1 \leq W_2/W_1 \leq 0.5,$$

edge portions of said narrow ribs being chamfered, an angle of inclination $\alpha$ of the depthwise axis of each of said narrow grooves with respect to the normal of said tread surface, and an angle of inclination $\beta$ of each of main groove side walls, which face the tread center, of said tread elements adjacent to said narrow ribs with respect to the normal of said tread surface being set so that they have the relation of $0<\alpha<\beta$, and the relation between said angles $\alpha$, $\beta$ and an angle of inclination $\theta$ of a tread surface of each of said tread elements adjacent to said narrow ribs with respect to the axis of said tire being such that:

$$3.4\theta \leq (\alpha+\beta)/2 \leq 6.4\theta.$$

* * * * *